US006625773B1

(12) United States Patent
Boivie et al.

(10) Patent No.: US 6,625,773 B1
(45) Date of Patent: Sep. 23, 2003

(54) SYSTEM FOR MULTICAST COMMUNICATIONS IN PACKET SWITCHED NETWORKS

(75) Inventors: Richard H. Boivie, Monroe, CT (US); Brian E. Carpenter, Evanston, IL (US); Kiyoshi Maruyama, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,101

(22) Filed: Jun. 9, 1999

(51) Int. Cl.[7] .......................... H04L 1/18; H04L 12/56; H04J 3/26; G06F 15/16
(52) U.S. Cl. ...................... 714/749; 370/400; 370/432; 709/200
(58) Field of Search ............................. 714/716, 733, 714/726, 727, 712, 713, 717, 748, 749, 776; 370/389, 390, 392, 393, 400, 401, 402, 403, 404, 405, 406, 407, 408, 432, 475; 209/200–204, 212–214, 227, 228, 232, 233, 236–238

(56) References Cited

U.S. PATENT DOCUMENTS

| | | | | |
|---|---|---|---|---|
| 5,541,927 A | * | 7/1996 | Kristol et al. ................ | 370/408 |
| 5,627,970 A | * | 5/1997 | Keshav ......................... | 709/233 |
| 5,727,002 A | * | 3/1998 | Miller et al. ................... | 371/32 |
| 6,014,380 A | * | 1/2000 | Hendel et al. ............... | 370/392 |
| 6,018,766 A | * | 1/2000 | Samuel et al. ............... | 709/218 |
| 6,167,051 A | * | 12/2000 | Nagami et al. .............. | 370/397 |
| 6,195,706 B1 | * | 2/2001 | Scott ........................... | 709/245 |
| 6,331,983 B1 | * | 12/2001 | Haggerty et al. ............ | 370/400 |
| 6,415,312 B1 | * | 7/2002 | Boivie ......................... | 709/200 |

OTHER PUBLICATIONS

L. Aguilar, "Datagram Routing for Internet Multicasting", Sigcomm84, Mar. 1984, pp. 58–63.
Dalal, Y.K.; Metcalfe, R.M.; "Reverse Path Forwarding of Broadcast Packets", Communications of the ACM, vol. 21, No. 12, Dec. 1978, pp. 1040–1048.

* cited by examiner

Primary Examiner—Albert Decady
Assistant Examiner—Matthew C. Dooley
(74) Attorney, Agent, or Firm—Casey P. August; Michael J. Buchenhorner; Fleit, Kain, Gibbons, Gutman & Bongini P.L.

(57) ABSTRACT

A multicast communication system for small groups using a protocol to indicate to routers receiving a packet according to the protocol to perform the following process: (1) determining a next hop for each of the destination nodes listed in the packet received; (2) partitioning the destination nodes into groups according to the next hop determined for each destination node in the preceding step; (3) replicating the packet such that there is at least one copy of the packet for each of the next hops; (4) modifying the list of addresses for the destination nodes such that the list of addresses for each of the next hops includes only the addresses for the destination nodes to be routed in that next hop; and (5) transmitting the modified copies of the packet to the next hops found in the previous steps for routing to the addresses included in each packet.

41 Claims, 2 Drawing Sheets

SYSTEM FOR MULTICAST COMMUNICATIONS IN PACKET SWITCHED NETWORKS

CROSS-REFERENCE TO RELATED APPLICATIONS

This application relates to technology similar to that of U.S. patent applications Ser. Nos. 09/240,546 and 09/240,549, which are both assigned to the same entity as this application and which are herein incorporated by reference.

BACKGROUND OF THE INVENTION

1. Field of the Invention

The invention disclosed broadly relates to the field of computer networks, and more particularly relates to the field of multicasting under various protocols including the Internet Protocol (IP).

2. Description of the Related Art

The Internet has provided the public worldwide network required for the global linking of various networks and application of personal computers. In this regard, the Internet Protocol ("IP") has become an important moving force for the growth of computer applicability. The Internet is a packet-based communication system. Each packet comprises a header portion that includes routing information and a payload (or message) portion that includes the data to be delivered. The header portion includes a destination address, a source address, and a portion identifying the protocol to be used. IP packets can be transmitted as unicasts or multicasts. A unicast is a point-to-point transmission in which the destination address corresponds to a single node. A multicast is used to send a packet to a group of destinations. In the case of a multicast, the destination address in the IP header corresponds to a group of several destination nodes. Thus, a multicast would be initiated by a source node sending an IP packet to a "group" address such that it reaches all the nodes in the group. There are various multicast algorithms in common use today.

The IP protocol has many applications such as electronic-mail and IP telephony. In the future as the Internet and the IP protocol become increasingly important in communications, IP multicast will become increasingly important, and it will become very important to support large numbers of "small" multicast groups. This will be driven by several developments—such as IP Telephony and the emergence of small, mobile computing devices that are capable of supporting real-time voice and data communications. As IP telephony becomes widely adopted, it will become very important to support large numbers of conference calls with a small number of parties (such as 5 or less). It seems reasonable to expect that there will be a similar need to support many similarly small voice-data conferences and voice-data-video conferences. Multicasting offers one solution to the problem of providing efficient communications within groups.

Some of today's IP multicast schemes, such as the "dense mode" schemes, are suitable for the case in which there are a relatively small number of large multicast groups that are of interest all over the Internet. These work well if one is trying to distribute "broadcast channels" like ABC, NBC, CBS, BBC, CNN and ESPN to viewers all around the world but they have scalability problems when there is a large number of groups. In some of these schemes, the nodes in the IP network build a distribution tree for each source and multicast group pair and they disseminate this multicast routing information to places where it is not needed—which leads to scaling problems if there are a large number of multicast groups.

In other schemes such as CBT (Core Based Trees) there has been an attempt to limit the amount of multicast routing information that needs to be disseminated, processed, and stored throughout the network. These schemes use a "shared distribution tree" that is shared by all the members of a multicast group and they try to limit the distribution of multicast routing information so that this information only goes to the nodes that "really need it." But these schemes also have problems. These problems include: (1) the tendency to concentrate traffic on small portions of a network and the use of less than optimal paths in routing packets to their destinations, and (2) the requirement that each of the routers on a multicast tree "signal," process, and store the multicast routing information, which can be a problem if there are a large number of multicast groups. They also require that the multicast routing information for the various multicast groups be communicated across inter-AS administrative boundaries (an AS is an Autonomous System such as the AT&T network). These requirements cause scaleability problems and increase administrative complexity if there are a large number of multicast groups.

Accordingly, there is a need for a system which overcomes the above problems.

SUMMARY OF THE INVENTION

The multicasting system described herein provides a solution for the problems discussed above for the case of small groups. Thus, according to the invention, a method for multicast communications in a packet-switched network comprises the source node steps of:

(1) including a plurality of addresses for destination nodes in a packet;

(2) including an identification of a protocol for small group multicast; and (3) transmitting the packet to the destination nodes.

The protocol for small group multicast indicates to routers receiving the packet to perform the following process:

(1) determining a next hop for each of the destination nodes listed in the packet received;

(2) partitioning the destination nodes into groups according to the next hop determined for each destination node in the preceding step;

(3) replicating the packet such that there is at least one copy of the packet for each of the next hops;

(4) modifying the list of addresses for the destination nodes such that the list of addresses for each of the next hops includes only the addresses for the destination nodes to be routed through that next hop; and (5) transmitting the modified copies of the packet to each of the next hops identified in the preceding steps for routing to the addresses included in each packet.

DETAILED DESCRIPTION OF AN EMBODIMENT

A multicast scheme, according to the invention seeks to eliminate the problems discussed above for the case of small groups. It is very scaleable in that it can handle a very large number of these groups since the nodes in the network do not need to disseminate or store any multicast routing information for these groups. And since it does not use any multicast routing protocol, there are no inter-AS multicast routing "peering" issues to contend with. The invention has the additional benefit that packets always take the "right" path as determined by the ordinary unicast route protocols. Unlike the "shared tree" schemes, the new scheme minimizes network latency and maximizes network efficiency. Thus, the invention removes some important obstacles that have, to this point, prevented the widespread acceptance and adoption of multicast and can make multicast practical for very large numbers of small groups—which as suggested above is a very important case. (The scheme described here may not be appropriate for "broadcast" channels, e.g. broadcasting an IETF meeting all across the Internet—but solutions already exist for that problem).

Figure 1:
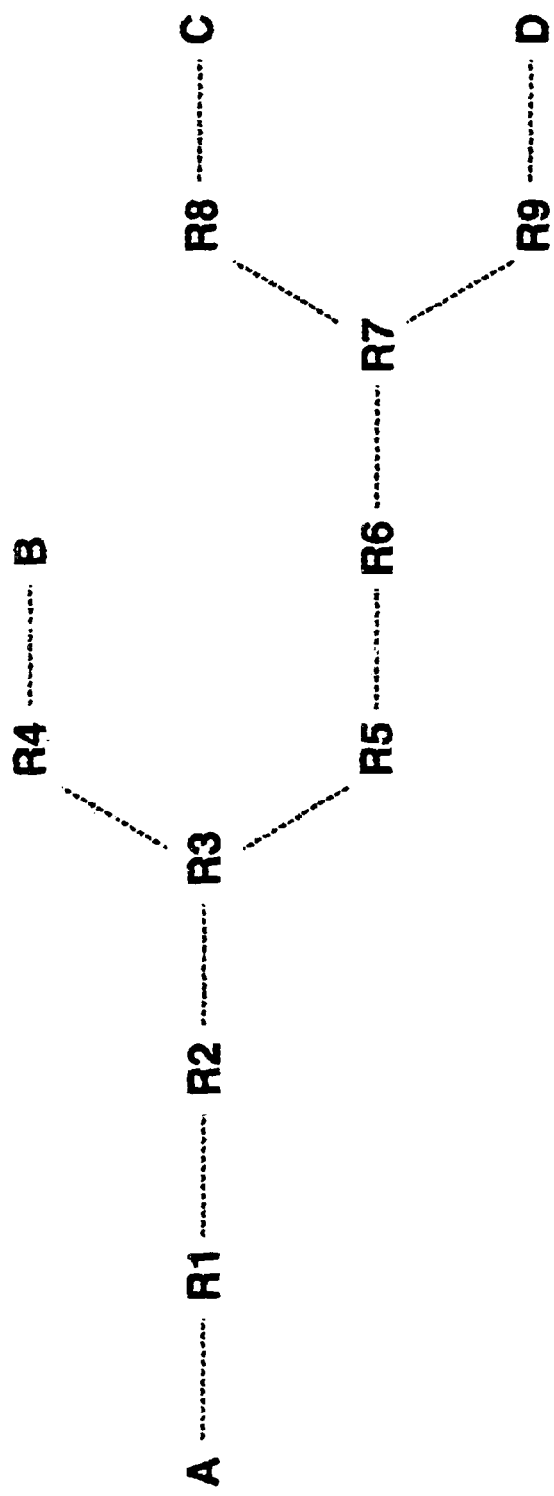
FIG. 1 is an illustration of a portion of an IP network according to the present invention.

Referring to FIG. 1 there is shown a portion of a data network (or system) 10 representing an embodiment of the invention. The network 10 includes a plurality of nodes each comprising end-stations which can be large host computers or user stations like personal computers or telephone handsets, and intermediate nodes which can be routers or switches. The network 10 further comprises a series of routers R1–R9 including some routers that are located at points in the network where there is a fork in the multicast transmission tree (represented by nodes R3 and R7). The nodes in the network 10 are coupled by means of a plurality (two or more) of links.

The network 10 can be operated under the IP but the principles of the invention also apply to other protocols such as Appletalk, Novell IPX or successors to any of those protocols. When the user of the source node A wishes to send a multicast data packet, the data processing system at source node A prepares a packet (or set of packets) that includes information that intermediate nodes can use to deliver the packet to the desired destinations. In the example shown, source node A can send a multicast transmission to destination nodes B, C and D by sending a transmission (including a packet or set of packets) to an intermediate node R1 that includes the desired list of destinations, B, C and D. The process by which these packets travel from the source to each of these destinations will be described in detail below.

The scheme described here takes advantage of one of the fundamental tenets of the Internet "philosophy," namely that one should move complexity to the edges of the network and keep the middle of the network simple. This is the principle that guided the design of IP and TCP and it is the principle that has made the incredible growth of the Internet possible. The reason that the Internet has been able to scale so well is that the routers in the core of the network deal with large CIDR blocks as opposed to individual hosts or individual "connections." The routers in the core do not need to keep track of the individual TCP connections that are passing through them. The IETF's diffserv effort is based on the idea that the routers should not have to keep track of a large number of individual RSVP flows that might be passing through them. It is our belief that the routers in the core should not have to keep track of a large number of individual multicast flows either.

The idea here is to let the source node keep track of the destinations that it wants to send packets to and eliminate the need for the routers to store any state for the various multicast groups. For example, lets suppose that A is trying to get his packets distributed to B, C & D in FIG. 1.

This can be accomplished as follows. A can send a new type of packet, according to the invention, to its default router, R1, that includes the list of destinations for the packet. The new packet type, which can be called "small group multicast" packet, is a level 3 packet which is to say that it is at the same level as IP in the protocol stack. In fact it has much the same function as an IP packet, except for the fact that it is addressed to a list of destinations as opposed to a single destination. Ignoring some details, the packet that A sends to R1 might look like this:

Level 2 header: <dest=level 2 address of R1>
   <src=level 2 address of A>
   <protocol=small group multicast>
   (i.e. a new level 3 packet type).
Level 3 header: <dest=B C D>
   <src=A> followed by the payload that A wants delivered to B, C and D.

When R1 receives this packet it needs to properly process the multicast. The processing that a router does on receiving one of these "small group multicast" packets is as follows:

Perform a route table lookup to determine the "next hop" for each of the destinations listed in the packet.

Partition the set of destinations based on their next hops.

Replicate the packet so that there is one copy of the packet for each of the next hops found in the previous steps.

Modify the list of destinations in each of the copies so that the list in the copy for a given next hop includes just the destinations that ought to be routed through the next hop.

Send the modified copies of the packet on to the next hops.

The replicated packet can include a time to live (TTL) field which is initialized to a value greater than one. This is done to avoid unnecessary routing through routers through which the packet has passed.

So, in the example above, R1 will send a single packet on to R2 with a destination list of <B C D> and R2 will send a single packet to R3 with the same destination list. As used herein, a next hop can be either an Internet router or the ultimate destination.

When R3 receives the packet, it will, by the algorithm above, send one copy of the packet to R4 with a destination list of B and one copy of the packet to R5 with a destination list of <C D>. R4 will then forward a single packet on to B. R5 will forward the packet that it receives on to R6 which will pass it on to R7.

When the packet reaches R7, R7 will send a packet on to R8, with a destination list of <C>, and a packet on to R9 with a destination list of <D>. (The packets sent to R8 and R9 could be "small group multicast" packets with a single address in the destination list or they could be ordinary unicast packets addressed to C & D respectively.) R8 and R9 will then forward appropriate packets on to C and D respectively.

One advantage of using an ordinary unicast for the last hop is that this allows hosts with "standard" TCP/IP stacks to receive the new multicast transmissions in a way that does not require any modifications in the host TCP/IP stacks. (If a source sends packets to a multicast "exploder," source nodes can also use "standard" TCP/IP stacks).

Note that it is important that the packet that is sent to a given next hop only includes destinations for which that next hop is the next hop listed in the route table. If the list of destinations in the packet sent to R4, for example, also included C and D, R4 would send "extra packets" on to those nodes on a less than optimum path. This could waste a lot of bandwidth if one is multicasting a videoconference, say. And this could cause serious problems when route loops occur since a multicast packet could "spray" a large number of packets in a number of different directions as it travels around the loop. Since the packet that is sent to a given next hop only includes the destinations that are supposed to be reached through that next hop, these problems are eliminated.

Note that when routing topology changes, the routing for a multicast flow will automatically adapt to the new topology since the path a multicast packet takes to a given destination always follows the ordinary, unicast routing for the destination.

One disadvantage of the proposed scheme is that all the routers between the source and the various destinations need to be able to properly process the new multicast packets. But, the scheme can be modified slightly to work around routers that do not understand the new scheme. In the modified scheme, the packet that A sends to R1 in the example above would look like this:

Level 2 header: <dest=level 2 address of R1>
   <src=level 2 address of A>
   <protocol=IP>
Level 3 header: <dest=R1>
   <src=A>
   <protocol=small group multicast>
   (i.e. a new protocol type)
Level "3.5" header: <dest=B C D>
   <src=A> followed by the payload that A wants delivered to B, C and D.

Note that a router does not understand this new protocol will, upon receiving this kind of packet, send an ICMP "destination unreachable, protocol unreachable" message back to the source if the router adheres to RFC1812 "Requirements for IP Version 4 Routers"—as all should. (Section 5.2.7.1 of RFC1812 says that a router should send an ICMP "Destination Unreachable" message with a code of 2, signifying "Protocol Unreachable" if the transport protocol designated in a datagram is not supported in the transport layer of the final destination). (If the ICMP message is lost for some reason, a subsequent "small group multicast" packet will cause another ICMP to be generated). Thus, the source will know when a router does not understand the new protocol. Furthermore, since the ICMP message will include the initial part of the original packet, the source will also know the destinations that are not reachable via the "small group multicast," so the source can use unicast packets to reach those destinations. When routing topology changes, additional ICMP "destination unreachable, protocol unreachable" messages may be generated and the source may use unicasts for additional destinations. The source can also periodically try a "small group multicast" for the destinations that are on its "unicast list" i.e. the list of nodes that it is reaching via unicast. Destinations that become reachable via "small group multicast" (i.e. those do not appear in subsequent ICMP "destination unreachable, protocol unreachable" messages) can then be removed from the unicast list.

Another possibility is to send a multicast "ping" periodically to the set of destinations and then use unicast to reach those destinations that do not respond to the ping.

Thus, the "small group multicast" scheme can perform some multicasting in an environment that includes "legacy" routers that do not understand the new scheme. It will not work particularly well if there are many routers that do not understand the scheme but this backwards compatibility may be important since it makes some of the benefits of multicast possible before all the routers in a network have been upgraded which can be very useful since it may take some time to upgrade all the routers in a large network.

The level 3.5 used above is a new level created for purposes of this invention that is between level 3 and level 4 in the TCP/IP stack.

In summary, the disadvantages of the "small group multicast" scheme are:
- the extra bytes that are sent in a multicast packet for the list of destinations
- the need to use unicast packets in some cases to reach destinations that are behind "legacy" routers
- the need for a new IP stack in sending host and routers
- the fact that the scheme is not suitable for huge "broadcast-like" multicasts. It is targeted for "small" conferences.

The key advantages are:
- it is very scaleable. It can handle a very large number of small groups.
- the work involved is limited to just the nodes that are on the multicast tree
- no per flow state information is stored on the routers
- no multicast route protocol messages are communicated or processed.
- no intra-AS or inter-AS route protocols.
- minimum administrative complexity. No need for complicated inter-AS peering agreements. It is just as easy for a network administrator to support multicast as it is to support unicast. And it is just as easy to support multicast across the Internet as it is to support unicast.
- traffic follows the correct paths. Traffic is not concentrated in a small part of the network. Minimum network latency. Maximum network efficiency.
- no need for class D addresses which means
- no need for a server that hands out class D addresses which can be a bottleneck or a point of failure
- no one can join the class D group and "eavesdrop" on the class D. address. The source knows who it is sending to.

One additional advantage is that the scheme can be easily adapted to provide a "reliable multicast." The multicast scheme that we have been discussing to this point provides for an "unreliable" multicast in which there is no provision for retransmitting packets that are lost due to network congestion or because they were garbled during transmission due to line-noise. This kind of "unreliable" transmission is useful in many applications in which the "timeliness" of packet delivery is more important that getting an "old" packet that was lost re-transmitted. IP telephony and video conferencing are applications in which the timeliness of packet delivery is important and the retransmission of lost packets is not useful.

In other applications, it makes sense to re-transmit a lost packet even if the re-transmitted packet is going to be 50 or 100 msec "late." For example, in a conferencing application, a reliable multicast could be used to reliably and efficiently transmit a foil presentation or the contents of a whiteboard or a shared document to multiple conference participants.

A reliable multicast scheme can be built by extending the multicast scheme that we have been discussing. The scheme would work as follows:
- an additional header which would include a sequence number and a checksum, similar to TCP, would be used to keep track of the bytes that have been sent and the bytes that have been successfully received by each of the receivers.

each of the receivers would send acknowledgments or ACKs to inform the sender of the bytes that have been successfully received. The checksum would be used to determine if a packet has been received error-free. As in TCP, the ACK includes a sequence number to indicate the last byte that has been successfully received. (The sequence number could be that of the last byte successfully received or the first byte that has not yet been successfully received).

as in TCP, the sender concludes that a receiver has not successfully received a packet when it does not receive an appropriate ACK within a certain period of time. As in TCP, the sender re-transmits a packet that has not been successfully received. But unlike TCP, which re-transmits a packet to a single receiver, the reliable multicast scheme may need to re-transmit a packet to more than one receiver.

When the sender needs to re-transmit a packet, it uses a multicast for the re-transmission. Since the sender knows the receivers that it needs to re-send to, it can re-send to just those receivers. Thus the re-transmissions are optimized and bandwidth is not wasted re-transmitting information to nodes that have already successfully received that information. (If the sender needs to re-transmit a packet to a single receiver, the "multicast" will, of course, be to a "tree" with a single leaf).

Figure 2:
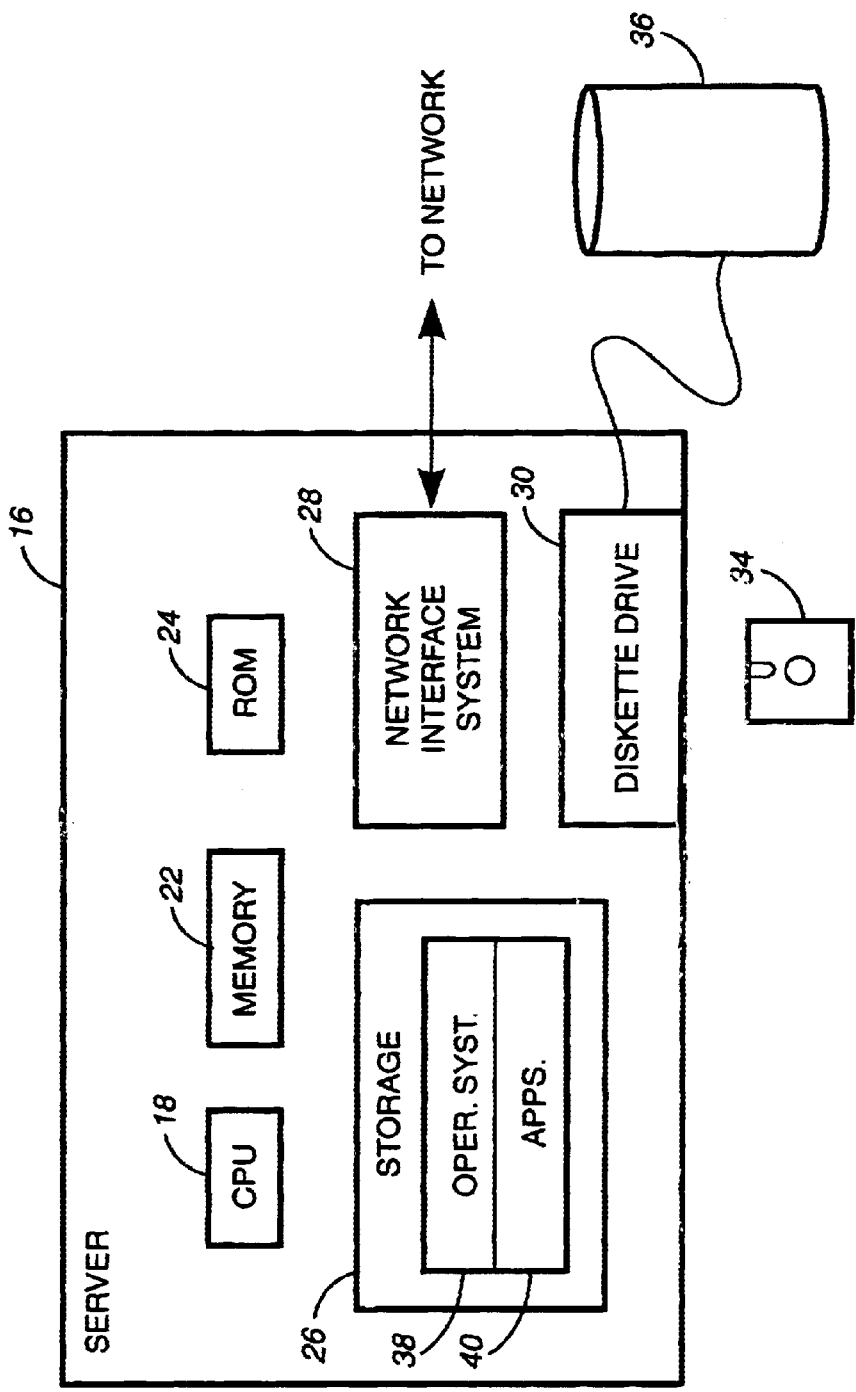
FIG. 2 is an illustration of a host IP processing unit for use according to the present invention.

Referring to FIG. 2, there is shown a simplified block diagram of a host system 16. The host system 16 could be used as any of the nodes shown in FIG. 1. The host system 16 comprises a processor 18, a memory 22 (e.g. RAM), a ROM (read-only memory) 24, a communication subsystem or network interface 28, and mass storage 26. The communication subsystem 28 can be implemented in a variety of ways including a modem or a communications card according to any of several known protocols such as Ethernet or Token Ring. The connections shown herein are vastly simplified for illustration purposes. The mass storage subsystem may be implemented as a hard disk drive and associated controller. The system 16 is equipped with a diskette drive 30 adapted to receive diskettes 34 but could also include a CD ROM drive or any other suitable drive for removable information storage media. As is typical with systems such as this, the mass storage includes an operating system 38, a plurality of applications programs and communication protocols 40. Additional storage may be included by for example linking to a database 36. Thus in accordance with one embodiment of the invention, the general purpose computing apparatus can be programmed via a set of diskettes, CD ROM or over a network to operate in accordance with the protocol set forth herein. Alternatively, special purpose apparatus can be designed to implement the functionality of the invention. Any of the nodes shown in FIG. 1 can be programmed or otherwise adapted to operate in accordance with the invention.

Each node unit can receive data packets under various protocols via the communication subsystem 28. The system 16 can also be used to package payloads (data) to create packets under a programmed protocol and to transmit such packets via subsystem 28 under the control of processor 18.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for reliable multicast communications in a packet-switched network comprising the source node steps of:
   including a plurality of addresses for destination nodes in a packet;
   including an identification of a protocol for small group multicast;
   including an error detection mechanism;
   transmitting the packet to the destination nodes;
   waiting for a period of time for at least one acknowledgment signal indicating receipt of the at least one packet delivery to at least one of the destination nodes; and
   retransmitting the packet to a set of destination nodes from which no positive acknowledgment signal has been received;
      wherein the protocol for small group multicast indicates to routers receiving the packet to perform the following process:
         determining a next hop for each of the destination nodes listed in the packet received;
         partitioning the destination nodes into groups according to the next hop determined for each destination node in the preceding step;
         replicating the packet such that there is at least one copy of the packet for each of the next hops;
         modifying the list of addresses for the destination nodes such that the list of addresses for each of the next hops includes only the addresses for the destination nodes to be routed through that next hop;
         transmitting the modified copies of the packet to each of the next hops identified in the preceding steps for routing to the addresses included in each packet.

2. The method of claim 1 wherein the method further comprises creating a level 2 header comprising a level 2 address for the source node's default router and a level 2 address for the source node and an indication that the protocol for small group multicast applies.

3. The method of claim 2 wherein the method further comprises creating a level 3 header comprising the addresses for the destination nodes to which the packet will be routed from the next hop node.

4. The method of claim 1 wherein the method further comprises:
   creating a level 2 header comprising: a level 2 address for a source node's default router; and a level 2 address for a source node;
   creating a level 3 header including an indication that a protocol for small group multicast applies; and
   creating a level 3.5 header including the addresses for the destination nodes to which the packet will be routed from the next hop node.

5. The method of claim 1 further comprising receiving an ICMP message from at least one node indicating that said node is not adapted to operate under the small group multicast protocol, and transmitting at least one packet under a unicast protocol to a set of destination nodes that are listed in the payload part of the returned ICMP message, responsive to receiving the ICMP message.

6. The method of claim 1 further comprising the steps of sending a multicast ping periodically to the destination nodes and transmitting unicast packets to those nodes that do not respond to a multicast ping.

7. The method of claim 1 wherein the method further comprises adding an additional header for providing reliable multicast communications.

8. The method of claim 1 further comprising including a time to live (TTL) field in the packet to be transmitted and initializing the TTL field to include an integer value greater than zero.

9. A method for reliable multicast communications in a packet-switched network comprising router node steps of:
   receiving a packet comprising a list of addresses for a plurality of destination nodes and an error detection mechanism;
   determining a next hop for each of the destination nodes listed in the packet received;
   partitioning the destination nodes into groups according to the next hop determined for each destination node in the preceding step;
   replicating the packet such that there is at least one copy of the packet for each one of the next hops;
   modifying the list of addresses for the destination nodes such that the list of addresses for each of the next hops includes only the addresses for the destination nodes to be routed through that next hop;
   transmitting the modified copies of the packet to each of the next hops for routing to the addresses included in each packet.

10. The method of claim 9 wherein the step of determining a next hop comprises performing a table lookup to determine the next hop for each of the destination nodes listed in the packet received.

11. The method of claim 9, further comprising receiving a packet comprising a level 2 header comprising a level 2 address for a router and a level 2 address for a source node and an indication that the protocol for small group multicast applies.

12. The method of claim 9, further comprising receiving a packet comprising a level 3 header comprising the addresses for the destination nodes to which the packet will be routed.

13. The method of claim 9, further comprising the step of receiving a packet comprising:
   a level 2 header comprising: a level 2 address for a router; and a level 2 address for a source node;
   a level 3 header including an indication that a protocol for small group multicast applies; and
   a level 3.5 header including the addresses for the destination nodes to which the packet will be routed.

14. The method of claim 9 further comprising transmitting a message to a source node indicating that a router cannot process the protocol of a received packet.

15. The method of claim 14 further comprising transmitting an ICMP message to a source node indicating that the router cannot process the protocol of the received packet when the router adheres to RFC 1812, requirements for the IP version 4 routers, or any successor document that supersedes RFC1812.

16. The method of claim 9 further comprising sending to a source node a message indicating that at least one of the destination nodes specified in the packet cannot be reached using the small group multicast protocol.

17. The method of claim 9 wherein the method further comprises adding an additional header for providing reliable multicast communications.

18. The method of claim 9 wherein the steps of receiving a packet and transmitting the modified copies is modified such that a copy is not transmitted to a given node if the original packet has been received from that node.

19. The method of claim 9 wherein the step of transmitting the modified copies comprises sending small group multicast packets to the next hops.

20. The method of claim 9 wherein the step of transmitting the modified copies comprises sending small group multicast packets to a given next hop when there is more than one destination routed through that next hop and sending ordinary unicast packets to a given next hop when there is a single destination routed through that next hop.

21. The method of claim 9 wherein the router nodes steps further comprise:
   receiving a packet including a time to live (TTL) field;
   replicating the packet including the TTL field;
   transmitting the modified copies;
   decrementing the TTL field in the packet before transmitting it to a next hop; and
   discarding the packet without transmitting it if the resulting value of the TTL field is 0.

22. The method of claim 9 wherein the router nodes steps further comprise:
   receiving a packet including a time to live (TTL) field; and
   discarding the received packet if the value of the TTL field is 1 or less.

23. A computer readable medium comprising programming instructions for reliable multicast communications in a packet-switched network, the programming instructions comprising:
   receiving a packet comprising a list of addresses for a plurality of destination nodes and an error detection mechanism;
   determining a next hop for each of the destination nodes listed in the packet received;
   partitioning the destination nodes into groups according to the next hop determined for each destination node in the preceding step;
   replicating the packet such that there is at least one copy of the packet for each of the next hops;
   modifying the list of addresses for the destination nodes such that the list of addresses for each of the next hops includes only the addresses for the destination nodes to be routed through that next hop;
   transmitting the modified copies of the packet to the next hops found in the previous steps for routing to the addresses included in each packet.

24. The medium of claim 23 wherein the instruction for determining a next hop comprises performing a table lookup to determine the next hop for each of the destination nodes listed in the packet received.

25. The medium of claim 23 further comprising instructions for receiving a packet comprising a level 2 header comprising a level 2 address for a router and a level 2 address for a source node and an indication that the protocol for small group multicast applies.

26. The medium of claim 23 further comprising instructions for receiving a packet comprising a level 3 header comprising the addresses for the destination nodes to which the packet will be routed.

27. The medium of claim 23 further comprising instructions for receiving a packet comprising:
   a level 2 header comprising: a level 2 address for a router; and a level 2 address for a source node;
   a level 3 header including an indication that the small group multicast protocol applies; and a level 3.5 header including the addresses for the destination nodes to which the packet will be routed.

28. The medium of claim 23 further comprising instructions for adding an additional header for providing reliable multicast communications.

29. The method of claim 1 wherein the step of retransmitting includes retransmitting a unicast packet to each of the next hops from which no positive acknowledgment has been received.

30. The method of claim 1 wherein the step of retransmitting includes retransmitting a multicast packet to each of the next hops from which no positive acknowledgment has been received.

31. The method of claim 1 wherein the error detection mechanism is from the selected group consisting of checksum determination, cyclic redundancy check determination, sequence number and parity bit determination.

32. The method of claim 1 wherein the step of waiting further includes waiting for the earlier of a period of time for at least one acknowledgment signal or the receipt of a acknowledgment signal from one of the destination nodes that at least one packet delivery was in error.

33. The method of claim 32 wherein the step of waiting for, the receipt of a signal from one of the destination nodes is from the selected group consisting of checksum determination, cyclic redundancy check determination, sequence number, and parity bit determination.

34. A method for reliable multicast communications in a packet-switched network comprising the source node steps of:

including a plurality of addresses for destination nodes in a packet;

including an identification of a protocol for small group multicast;

including an error detection mechanism;

transmitting the packet to the destination nodes;

waiting for the receipt of a negative acknowledgment signal from one of the destination nodes that at least one packet delivery was in error; and retransmitting the packet to a set of destination nodes from which a negative acknowledgment signal has been received;

wherein the protocol for small group multicast indicates to routers receiving the packet to perform the following process:

determining a next hop for each of the destination nodes listed in the packet received;

partitioning the destination nodes into groups according to the next hop determined for each destination node in the preceding step;

replicating the packet such that there is at least one copy of the packet for each of the next hops;

modifying the list of addresses for the destination nodes such that the list of addresses for each of the next hops includes only the addresses for the destination nodes to be routed through that next hop;

transmitting the modified copies of the packet to each of the next hops identified in the preceding steps for routing to the addresses included in each packet.

35. A computer readable medium comprising programming instruction for reliable multicast communications in a packet-switched network comprising the source node steps of:

including a plurality of addresses for destination nodes in a packet;

including an identification of a protocol for small group multicast;

including an error detection mechanism;

transmitting the packet to the destination nodes, waiting for the receipt of a negative acknowledgment signal from one of the destination nodes that at least one packet delivery was in error; and retransmitting the packet to a set of destination nodes from which a negative acknowledgment signal has been received;

wherein the protocol for small group multicast indicates to routers receiving the packet to perform the following process:

determining a next hop for each of the destination nodes listed in the packet received;

partitioning the destination nodes into groups according to the next hop determined for each destination node in the preceding step;

replicating the packet such that there is at least one copy of the packet for each of the next hops;

modifying the list of addresses for the destination nodes such that the list of addresses for each of the next hops includes only the addresses for the destination nodes to be routed through that next hop;

transmitting the modified copies of the packet to each of the next hops identified in the preceding steps for routing to the addresses included in each packet.

36. The method of claim 35, wherein the step of waiting for a negative acknowledgment signal is from the selected group consisting of checksum determination, cyclic redundancy check determination, sequence number, and parity bit determination.

37. The method of claim 9 wherein the error detection mechanism is from the selected group consisting of checksum determination, cyclic redundancy check determination, sequence number and parity bit determination.

38. The method of claim 9 further includes the steps of:

waiting for a period of time for at least one acknowledgment signal indicating receipt of the at least one packet delivery to at least one of the destination nodes; and retransmitting the packet to a set of destination nodes from which no positive acknowledgment signal has been received.

39. The method of claim 37 wherein the step of retransmitting includes retransmitting a unicast packet to a set of destination nodes from which no positive acknowledgment signal has been received.

40. The method of claim 37 wherein the step of retransmitting includes retransmitting a multicast packet to a set of destination nodes from which no positive acknowledgment signal has been received.

41. The method of claim 23 wherein the error detection mechanism is from the selected group consisting of checksum determination, cyclic redundancy check determination, sequence number and parity bit determination.

* * * * *